United States Patent [19]

Laurer et al.

[11] 3,909,787

[45] Sept. 30, 1975

[54] CANDIDATE SELECTION PROCESSOR

[75] Inventors: George Joseph Laurer, Raleigh; Eugene Arnold Moore, Cary, both of N.C.

[73] Assignee: International Business Machines Corporation, Armonk, N.Y.

[22] Filed: July 1, 1974

[21] Appl. No.: 484,509

[52] U.S. Cl. .................... 340/146.3 Z; 235/61.11 E; 340/146.3 H

[51] Int. Cl.[2] .................... G06K 5/04

[58] Field of Search .............. 340/146.3 H, 146.3 Z; 235/61.11 E

[56] References Cited

UNITED STATES PATENTS

| | | | |
|---|---|---|---|
| 3,743,819 | 7/1973 | Kapsambelis et al. | 340/146.3 H |
| 3,800,282 | 3/1974 | Acker | 340/146.3 Z |
| 3,806,706 | 4/1974 | Hasslinger et al. | 340/146.3 Z |

*Primary Examiner*—Leo H. Boudreau
*Attorney, Agent, or Firm*—John B. Frisone

[57] ABSTRACT

A data processor for use in conjunction with a coded label scanner for scanning non-oriented coded labels and which concurrently examines multiple phases of the data stream generated by the scanner to identify those data stream combinations which may be valid candidates or data because of predetermined characteristics.

10 Claims, 4 Drawing Figures

CANDIDATE SELECTION PROCESSOR

BACKGROUND OF THE INVENTION

1. Field of the Invention

The invention relates to non-oriented coded label scanning in general and more particularly to a device for accepting the output of a coded label scanner and identifying those contiguous data stream combinations which meet predetermined criteria or characteristics which identify them as a potentially valid code combination extending across a significant portion of or all of the coded label.

2. Description of the Prior Art

The primary problem in scanning non-oriented labels located on merchandise containers or the like is locating or identifying the label. Typically, a box or container for merchandise will have many square inches of surface area with a variety of printed matter thereon in addition to the coded label which will be just slightly more than 1 square inch in area. The printed matter will yield code like signals when scanned which must be examined to determine if they are or are not valid coded characters. Since raw data related to the label represents a very small percentage of the total raw data supplied by the scanner, some means must be provided to limit the processing of the data.

The prior art teaches the use of unique start and end or framing characters not found in the coded data for indicating the presence of valid label data. This technique has not proven entirely reliable or satisfactory since it is entirely possible that extraneous printed matter will in many instances resemble the unique framing characters. An obvious solution is to extend or increase the complexity of the framing characters. This solution is not entirely acceptable since it increases the space required for printing the code and complicates the code and the scanning problem. The complication of the scanning problem results directly from the increased size required since the number of scans and the direction thereof is limited and increasing the label size decreases the probability that a scan will cross the minimum required area.

SUMMARY OF THE INVENTION

The invention contemplates a processor for use in conjunction with a coded label scanner which serially scans unoriented labels and provides a continuous multilevel signal having at least two states which correspond to the states or information on the coded label. The processor concurrently examines all possible phases of the signal supplied by the scanner over a period equal to all or a significant portion of the coded label and presents only those code signals having predetermined configurations to a decoding circuit for decoding and further processing.

DESCRIPTION OF THE PREFERRED EMBODIMENT

Figure 1:
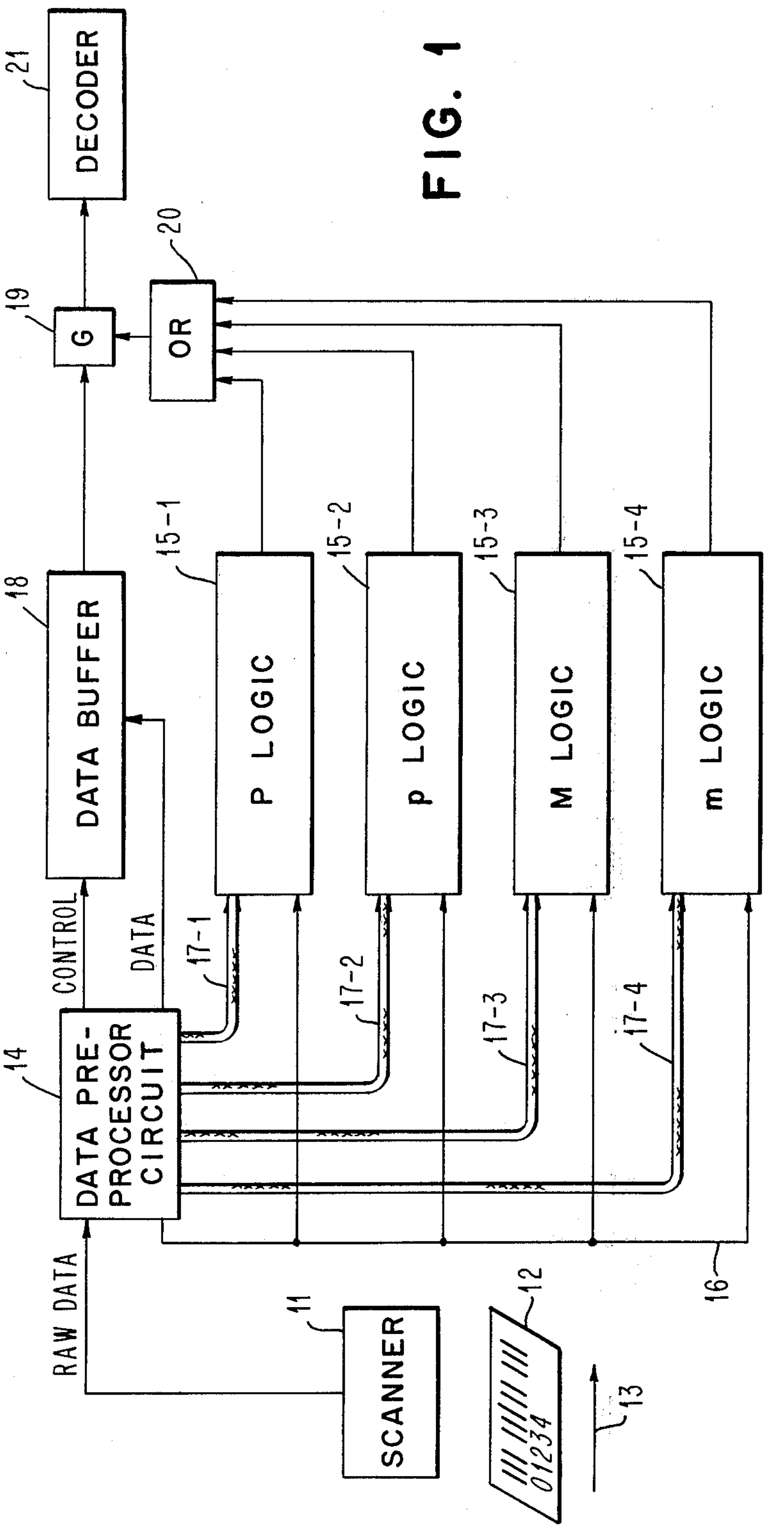
FIG. 1 is a block diagram of a novel data processor constructed in accordance with the invention for selecting potentially valid codes from a label scanner.

In FIG. 1, a scanner 11 of any conventional design is arranged to scan in multiple directions a label 12 bearing bar coded indicia. Relative movement between the label 12 and scanner 11 is indicated by arrow 13. The coded label 12 may have any orientation with respect to scanner 11. Since multiple scans are performed during transit of the label 12 across the scanner field, at least one of the scans will intercept all of the code bars represented on the label 12 in the drawing. The scanner will generate a square wave like output when it is scanning the code. Such an output signal is illustrated in the first graph in FIG. 3. The output of scanner 11 is labeled raw data and is applied to a preprocessor circuit 14.

This circuit provides a clockwise signal to four identical logic circuits 15-1 through 15-4 on a conductor 16. The data preprocessor circuit 14 also provides a plurality of control signals over cables 17-1 through 17-4 to logic circuits 15-1 through 15-4, respectively. In addition, data signals corresponding to the raw data are applied via preprocessing circuit 14 to a data buffer 18 under control of a control signal supplied by the preprocessor circuit 14. The individual logic circuits 15-1 through 15-4 in conjunction with the signals supplied via conductor 16 and conductor 17-1 through 17-4 continuously examine the different phases of the raw data over a predetermined length of time of the data signal. When any of these examinations result in a predetermined condition being detected, the logic circuit detecting that condition provides a signal to a gate 19 via an OR circuit 20 which causes the data then stored in buffer 18 to be transmitted to a decoder circuit 21 where the data is decoded and checked for accuracy.

As long as none of the logic circuits 15 determine that the predetermined conditions exist, the data in buffer 18 is not passed on but is replaced by subsequent data; thus, while the scanner is scanning portions of the container not related to the coded labels, such as printed matter or graphic illustrations on the container, the data stream coming from the scanner 11 is passed through the preprocessor circuit 14 and into the data buffer 18 where it remains and is replaced with successive data elements. As soon as properly coded information is scanned and valid raw data signals come in over the raw data line, and the preprocessor circuit 14, the conditions previously set forth are detected by the logic circuits 15-1 through 15-4 and the data then residing in data buffer 18 is passed via gate 19 to the decoder circuit 21.

Figure 2:
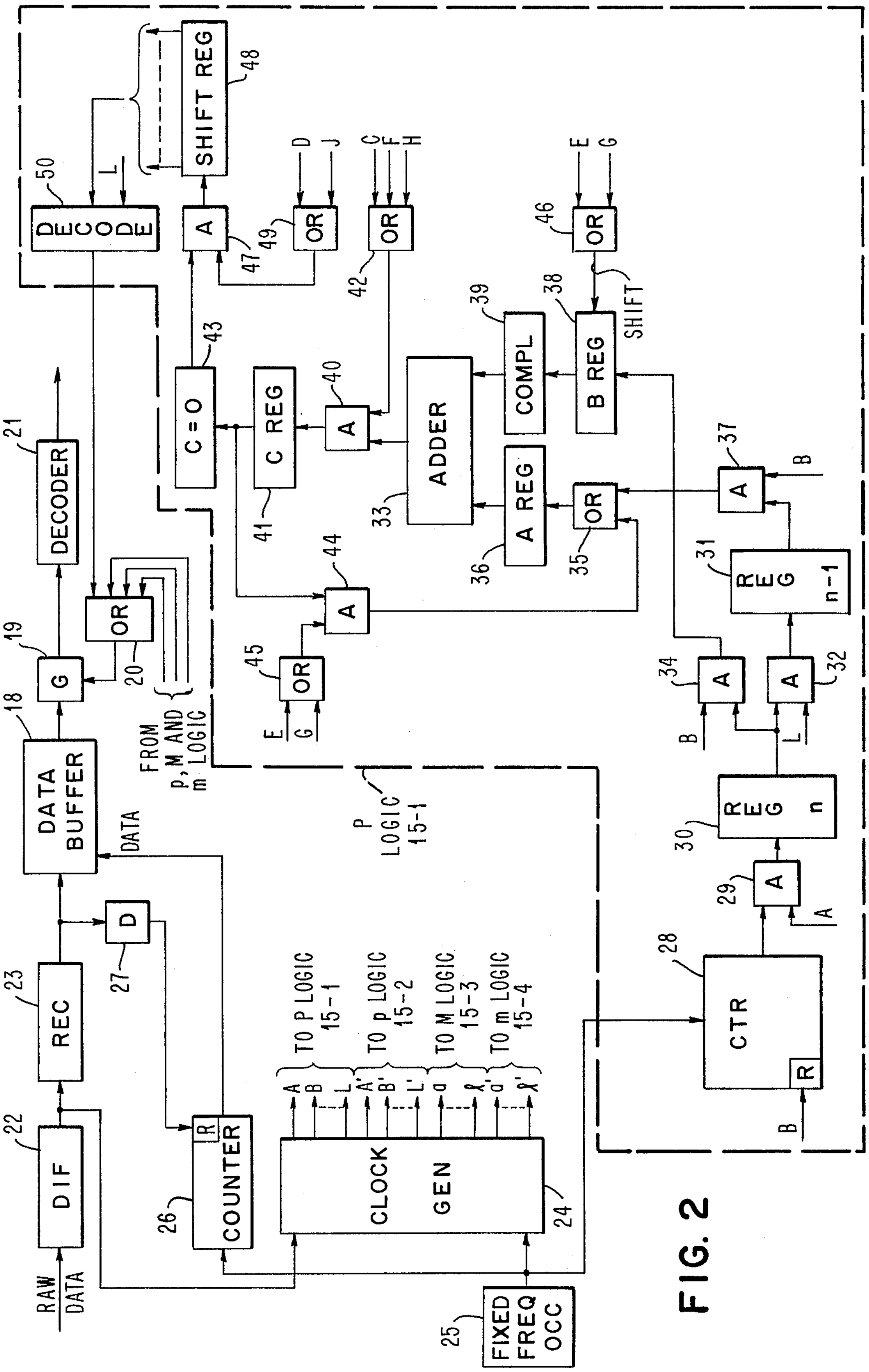
FIG. 2 is a block schematic diagram showing a single processing channel in greater detail than is shown in FIG. 1.
Figure 3:
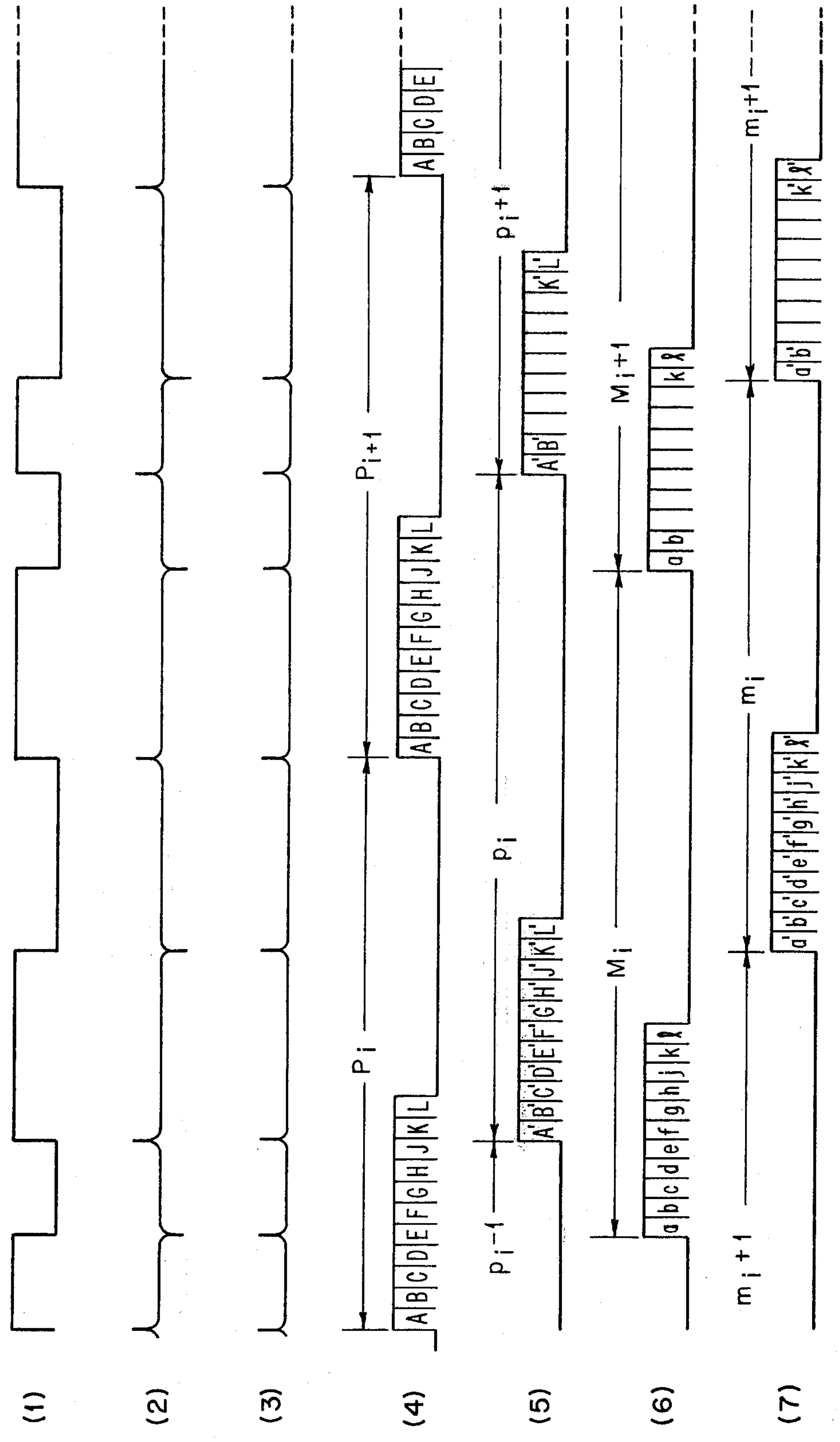
FIG. 3 is a series of graphical representations of signals generated and used in FIGS. 1 and 2.

The circuits illustrated in FIGS. 1 and 2 and the graphical representation shown in FIG. 3 are specific to the universal product code recently adopted by the grocery industry in the United States. A substantially similar code is described in a publication entitled "Proposed UPC Symbol, Revision No. 2, December 1972" and published by the International Business Machines Corporation. The symbol adopted includes 12 characters, six of which are arranged on one side of a center separator character and another six of which are arranged on the other side of the center separator character. In addition, guard bars are provided on either side of the symbol or label. Each of the characters within the symbol includes two spaces of high reflectivity and two spaces of low reflectivity such as two white bars and two black bars. Each of the characters is of uniform length and includes seven equal time slots or distances which are divided amongst the bars described above in a fashion described in the aforesaid publication. The center separator includes three white spaces and two black bars. The scanner preprocessor and logic described looks for one-half of the symbol only; that is, the portion of the symbol to either the left or right of the center separator. The code contains sufficient information to identify whether a scan has traversed a left side of the label or a right side of the label and whether the scan was from the inside out or the outside in, thus facilitating decoding. The decoding of the symbol is not described in this application since it does not constitute part of the invention.

The first graph in FIG. 3 represents the raw data at a time when a properly coded label is being scanned. The first positive pulse corresponds to a light space being traversed by the scanner. The following negative pulse corresponds to a dark space and so forth. The first two complete cycles correspond to a single character if the proper phasing relationships are assumed and would normally cover seven time periods as described above. Since the angle that the scanning beam makes with respect to the direction of the label is unknown, the time required to scan the character at a uniform scanning velocity will vary as a function of the angle. A scanning beam traversing the label at right angles would require the minimum length of time for a fixed scanning velocity. The time required at any other angle will be a function of the angle at which the beam traverses the coded label. Thus, absolute time measurements are meaningless in determining whether or not the scan is a result of traversing a valid coded label.

In addition, proper phase relationships must be considered since the characters on the left side of the label began with a white bar and terminate with a dark bar and the characters on the right side of the label begin with a dark bar, that is, a dark bar on the left, and terminate with a white bar on the right. If scanned in the reverse direction, the opposite is true for both sides of the label. It should be noted that the code set for the right and left side characters, that is, right and left sides with respect to the center separator, are different. A left half label scanned from left to right will be in proper phase with a white, black, white, black relationship for each of the characters. Whereas a left half label scanned from right to left will be black, white, black, white. This relationship is reversed if the right half of an upright label as illustrated in FIG. 1 of the aforementioned publication is considered. The logic circuits illustrated in FIG. 1 and in greater detail in FIG. 2 examine successive characters to determine whether or not the characters bear a certain timing relationship with respect to each other. When the proper timing relationship is detected by one of the logic circuits, the data stored in data buffer 18 is considered potentially valid since it has the proper form. This data is at this time passed by a gate to the decoder circuit 21 for decoding. Thus, decoder circuit 21 is not burdened with attempting to decode non-data like signals.

In FIG. 2, the raw data from scanner 11 is applied to a differentiating circuit 22 which provides an output illustrated in graph 2 of FIG. 3. The output of the differentiating circuit 22 is applied to a rectifier circuit 23 which provides the output illustrated in graph 3 of FIG. 3. In addition, the output of differentiator circuit 22 is applied to a clock generator circuit 24 which also receives the output from a fixed frequency oscillator 25. Clock generator 24 provides the outputs illustrated in graphs 4, 5, 6 and 7 of FIG. 3 from the two signals received. Eleven pulses A, B, C, D, E, F, G, H, J, K and L are provided on eleven different conductors. These eleven signals are generated starting with every other positive transition of the raw data signal and are repetitively generated. In graph 5, eleven additional signals A′ through L′ similar to those illustrated in graph 4 are repetitively provided on the alternate positive transitions of the raw data signal. Graph 6 illustrates eleven control signals a through 1 provided on every other negative transition of the raw data signal and graph 7 illustrates eleven signals $a'$ through $l'$ provided on the alternate negative transitions of the raw data signal. The signals illustrated in graph 4 are applied to logic circuit 15-1 identified as P logic. The signals illustrated in graph 5 are applied to logic circuit 15-2 identified as p logic. The signals in graph 6 are applied to logic circuit 15-3 identified as M logic and the circuit signals illustrated in graph 7 are applied to logic circuit 15-4 identified as m logic.

The output of fixed frequency oscillator 25 is also applied to a counter circuit 26 which counts the pulses from the oscillator. The reset input of counter 26 is connected via a delay circuit 27 to the output of rectifier circuit 23 and is reset at each transition of the raw data signal thus counter 26 at each transition includes a count corresponding to the width of the bar or space just scanned. The contents of counter 26 are shifted into the data buffer 18 under control of the output of rectifier 23 thus buffer 18 stores in serial format counter values corresponding to the successive pulse widths of the raw data signals supplied by the scanner. The number of signals stored in the data buffer is equal to the six characters in a half label plus the center separator character.

In FIG. 2, only one logic circuit 15-1 is illustrated in detail. The logic circuit 15-2 is identical in all respects to logic circuit 15-1. Logic circuits 15-3 and 15-4 are substantially identical with a minor modification which will be described later in the course of the description of the invention. Therefore, it is considered unnecessary to describe or illustrate in detail all four logic circuits.

The output from fixed frequency oscillator 25 is applied to a counter 24 which is reset to a predetermined value upon the occurrence of the B signal from clock generator 24. It should be noted from graph 4 of FIG. 3 that the B signal of clock generator 24 occurs shortly after the beginning of the cycle corresponding to alternate positive transitions of the raw data signals. The preset value of counter 28 is selected to permit the count to attain the correct value by the succeeding A signal of the next P cycle, thus the attained value of counter 28 at the time of the succeeding A signal in the P cycle corresponds to the time span or width of what would appear to be a complete character, that is, two complete cycles of the raw data signal. This can be seen by referring to graphs 1 and 4 of FIG. 3. The above applies also to the $p$ cycle, M cycle and $m$ cycle shown in graphs 5, 6 and 7, respectively. The only difference is the phase relationship of these signals, each of which corresponds to one of the possible phases of the raw data signal. Counter 28 is connected by an AND gate 29 to a register 30 and upon the occurrence of each A signal from clock generator 24, the then attained value of counter 28 is inserted in register 30. Register 30 is labeled $n$ to indicate the $n$th sample of the raw data signal corresponding to a potential character being processed. On the following control signal from clock generator 24, counter 28 is reset to again accumulate a count during the next potential character in the raw data.

The contents of register 30 are transferred to a register 31 via an AND circuit 32 upon the provision of the L control pulse from clock generator circuit 24. The L control pulse is the last in the series of control pulses illustrated in graph 4 of FIG. 3. Upon the occurrence of the following A control pulse from clock generator 24, two successive values are contained in registers 30 and 31 which correspond to two adjacent potential characters as seen in graph 1 of FIG. 3, namely, the portions of the signal corresponding to Pi and Pi+1. Register 31 is given the designation $n-1$ to indicate that it is the older of the two samples. The $n$th sample is the current sample and is in register 30. These two samples are applied via circuits which will be described below to an adder circuit 33. Upon the occurrence of each B control signal from clock generator 24, the contents of register 30 are applied to adder circuit 33 via an AND circuit 34, a B register 38, and a complimenting circuit 39. The AND circuit 34 is enabled by the B signal from clock generator 24. The contents of register 31 are applied to the adder circuit 33 via an AND circuit 37, an OR circuit 35 and an A register 36. AND circuit 37 is enabled by the B signal from clock generator 24. Thus, adder circuit 33 provides the difference between the contents of the A register 36 and the contents of the B register 38.

The output of adder 33 is applied via an AND gate 40 to a C register 41. AND gate 40 is enabled via an OR circuit 42 on the C, F, and H control signals from clock generator 24. The output of C register 41 is connected to a detector circuit 43 which provides an output whenever the contents of register 41 are zero. The output of register 41 is also applied via an AND circuit 44 to another input of OR circuit 35. AND circuit 44 is enabled by the output of an OR circuit 45 during the E and G outputs of clock generator 24. The contents of B register 38 are shifted one position by the output of an OR circuit 46 connected to the E and G outputs of clock generator 24. With the circuit arrangement thus far described, circuit 33 subtracts the contents of the $n$ register 30 from the $n-1$ register 31 following the occurrence of the B signal from clock generator 24. The result of this subtraction is inserted during the C signal into the C register 41. If the contents of these registers are the same, detector circuit 43 detects the 0 condition in C register 41 and provides an output via an AND circuit 47 to a shift register 48 causing a 1 to be shifted into the register 48. This event occurs during the D signal from clock generator 24 which is applied via an OR circuit 49 to the AND gate 47. When the E signal from clock generator 24 is provided the contents of C register 41 are applied via AND circuit 44, OR circuit 35 to A register 36 simultaneously therewith the contents of the B register 38 are shifted one position and the contents of the C register become $(n-1)-n-\frac{1}{2}n$. This signal is stored in register 41 during the F signal time from clock generator 24 via OR circuit 42 and AND circuit 40. During the G signal time from clock generator 24, the contents of C register 41 are applied via AND circuit 44, OR circuit 35 and A register 36 to adder 33. During this same time period, the contents of B register 38 are again shifted one position and the adder output becomes $(n-1)-n-\frac{1}{2}n-\frac{1}{4}n$ which reduces to $(n-1)-7/4n$. If this quantity equals 0, a 1 is shifted into register 48 during the J signal time from clock generator 24 via OR circuit 49 and AND gate 47. In the above description, if the contents of the C register 41 are not equal to 0, during the D and J signal times a 0 is shifted into register 48 in lieu of the 1 described above. Thus, for each character cycle of the raw data signal, two bits, either a 0 or a 1, are shifted into register 48. Register 48, for the UPC symbol considered in this application, contains 12 positions. The bit pattern contained in shift register 48 will identify when a valid code combination has been examined. The output of shift register 48 is connected to an AND gate decoder 50 which looks for the correct pattern of 1's and 0's in the shift register at L signal time. When the correct pattern is decoded, gate 19 is enabled by OR gate 20 and the contents in the data buffer 18 are passed on to the decoder circuit 21 described above in connection with FIG. 1.

Logic circuits 15-3 and 15-4 as previously stated are substantially identical to logic circuit 15-1. The only difference between the two logic circuits is the connection of the outputs of register 30 and 31. For these two circuits, the connections of the outputs of these circuits are inverted. That is, AND gate 34 is connected to OR circuit 35 while AND gate 37 is connected to B register 38. The operations remains identical simply changing the mathematical computations performed. The reasons for this change will be discussed below.

At the end of the time periods, Pi, *pi*, Mi, *mi*, the contents of the counters 28 are stored in the n registers 30 and the stored values that formerly occupied these registers are transferred to the $n-1$ registers 31. The data in the registers is then transferred as described to the A and B registers 36 and 38, respectively. Subtractions previously described are performed. If the results of the subtraction is 0, then the expression $B \div A = 1$ is satisfied. This satisfaction if it occurs is remembered by storing a 1 in the shift register. If it is not satisfied, the condition is remembered by storing a 0.

The B register 38 is shifted right one position and the results of the previous subtractions are transferred to the A register 36. The B register 38 is again subtracted from the A register making the total contents of the C register at this time equal to $A - B - \frac{1}{2} B$. The contents of C register 41 are again transferred to the A register at the same time the B register is again shifted right one position and the subtraction is again completed making the contents of the C register 41 at this time equal to $A - B - \frac{1}{2} B - \frac{1}{4} B$. This expression may be reduced to $A - 7/4\ B$. If the contents of the C register after this last subtraction is 0 then $A/B = 7/4$. This fact is remembered by storing a 1 in the shift register if the condition is met. If the contents of C register 41 are not equal to 0, a 0 is stored in the shift register 48. Then, if $B = n$ and $A = n-1$ as in circuits 15-1 and 15-2, the arithmetic performed is $n \div n-1 = 4/7$. If $B = n-1$ and $A = n$ as in circuits 15-3 and 15-4, the arithmetic performed is $n \div n-1 = 7/4$. These are the ratios for the portion of the center separator including two white and two black bars to a character for the proper phase. The shift register decode for circuits 15-1 and 15-2 is 101010101001 and for circuits 15-3 and 15-4, it is 011010101010.

Decoder 50 examines the contents of shift register 48 at L signal time for the proper bit pattern combination which indicates that the data residing in data buffer 18 is valid. The gate 19 is enabled and the data is transferred to the decoder circuit 21.

The four logic circuits operate concurrently examining the raw data content. Obviously, at any instant in time, only one of the logic circuits will enable gate 19 since only one of the combinations being examined will be valid data. In the interests of simplicity, plural adder circuits 33 are assumed in the above description. However, due to the scanning rate involved, a single adder circuit could be time shared amongst the four logic circuits as would be apparent to those skilled in this art. In addition, it will be apparent to those skilled in the art that either a special or general purpose digital computer may be programmed to perform many of the functions described above utilizing memory for the register space and the logical functions of the machine as well as the arithmetic unit to perform the functions described.

Figure 4:
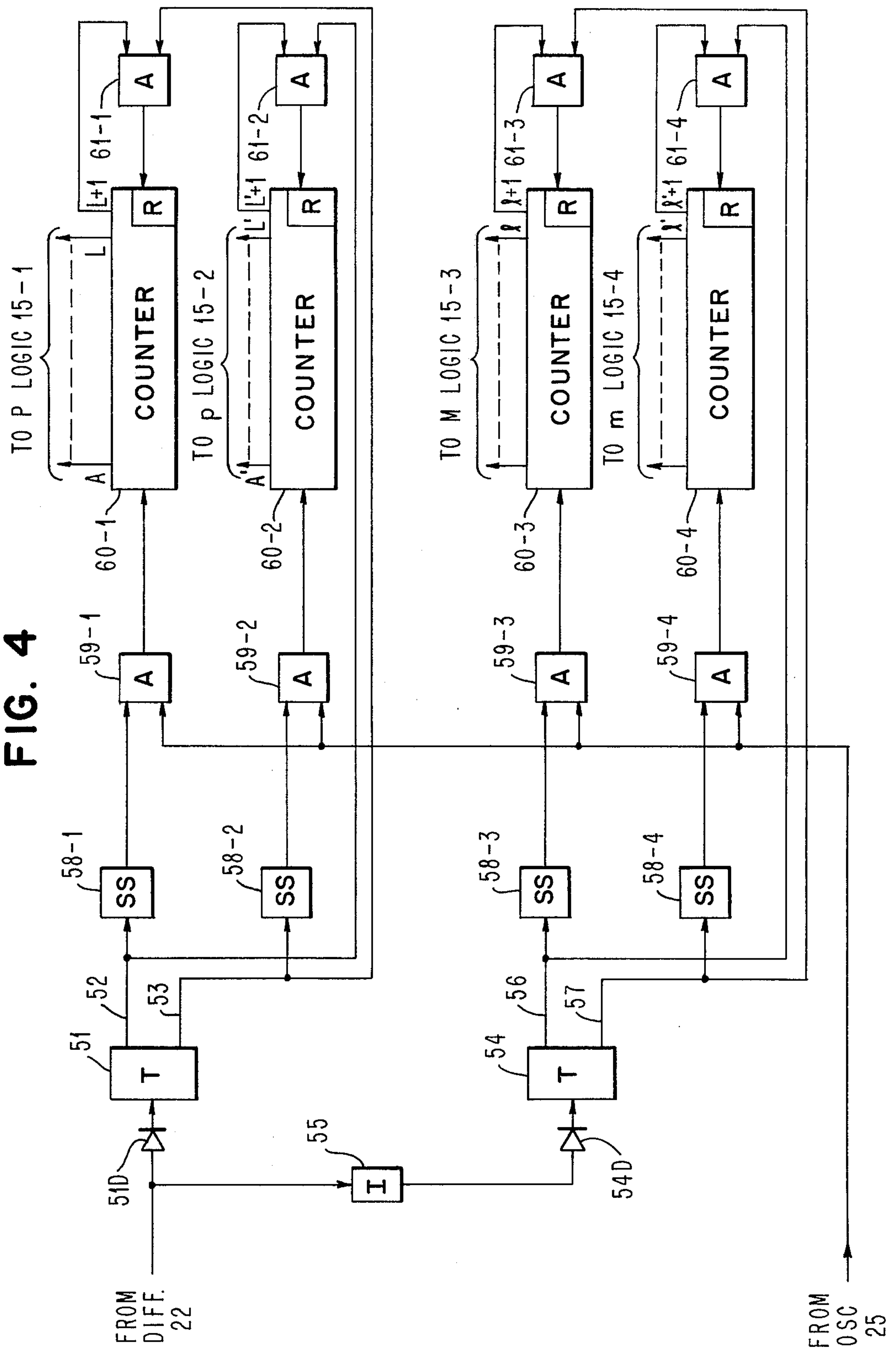
FIG. 4 is a block schematic diagram of the clock generator shown in block form in FIG. 2.

In FIG. 4, a trigger circuit 51 which responds to positive pulses is connected by a diode 51D to differentiator 22. The positive pulses illustrated in graph 2 of FIG. 3 cause the trigger 51 to change state and the two outputs of the trigger circuit 52 and 53 correspond to the A-L and A'-L' outputs illustrated in graphs 4 and 5, respectively, of FIG. 3. A second trigger circuit 54 is connected to the output of differentiator circuit 22 by a diode 54D and an inverter circuit 55 thus causing trigger circuit 54 to change state with the negative pulses from differentiator 22. The two outputs 56 and 57 of trigger 54 correspond to the $a-l$ and $a'-l'$ outputs illustrated in graphs 6 and 7, respectively, of FIG. 3.

The outputs 52, 53, 56 and 57 are applied to identical clock pulse generating circuits which provide the pulses illustrated in graphs 4, 5, 6 and 7, respectively, of FIG. 3. Output 52 is connected to a single shot circit 58-1 which provides an enabling output to one input of an AND gate 59-1 to cause gate 59-1 to pass pulses from oscillator 25 to a counter 60-1. Counter 60-1 under control of the pulses from oscillator 25 provides the sequential outputs A, B, C, D, E, F, G, H, J, K and L described above. The counter steps one additional time and provides an L+1 output which is applied to one input of an AND gate 61-1 which has a second input connected to output 53. When both conditions are satisfied, AND gate 61-1 provides an output which is used to reset ring counter 60-1 so that it is ready to operate again as described above.

While the invention has been particularly shown and described with reference to a preferred embodiment thereof, it will understood by those skilled in the art that various changes in form and details may be made therein without departing from the spirit and scope of the invention.

What is claimed is:

1. A processor for selecting potentially valid code signals supplied by a coded label scanner which serially scans non-oriented coded labels and provides a continuous multilevel signal having at least two levels corresponding to the coded information on the label, said coded label having a plurality of encoded characters each of which includes a plurality of abutting substantially rectangular bars of differing characteristics, said bars for each of said characters having substantially the same total width in the direction of information content and at least one additional character having at least as many bars as the aforesaid characters and in which the total width of a number of bars equal to the number of bars in each of the aforesaid characters is of substantially different total width in the direction of information content comprising:

first means connected to said scanner for storing an epoch of the signal corresponding to the potentially valid code to be selected from amongst the signals received from the scanner;

second means responsive to the signals from said scanner for forming electric signals, for each of the character phases, which correspond to the total width of the character in the direction of information content;

third means for comparing substantially simultaneously for each of said character phases of the signal, the total width in the direction of information content of successive characters and encoding at least two predetermined relationships;

fourth means for substantially simultaneously examining the encoded relationships and providing output signals whenever the said encoded relationships have a predetermined format; and fifth means responsive to the output signals provided by said fourth means for gating the then stored epoch of the signal in the first means to a utilization device.

2. The processor set forth in claim 1 in which the number of phases $\phi$ equals the number of bars $\psi$ used to encode each of the characters and each of the phases $\phi 1-\phi n$ for an $n$ bar coded character coincide in time with the transition occurring when the leading edge of the bars $\psi 1-\psi n$ are detected by the scanner in a repetitive sequence.

3. The processor set forth in claim 2 in which the signal supplied by the said scanner is substantially a square wave signal which the scanner generates when scanning the coded label with a substantially constant velocity to provide a square wave signal corresponding to the bar coded label and said first means includes:

circuit means for providing control signals coincident with the transitions of the square wave signal supplied by the scanner;

a fixed frequency oscillator for providing electric signals at a fixed predetermined frequency; and counter means responsive to the control signals from said circuit means and said electric signals from fixed frequency oscillator for providing a count signal corresponding to the elapsed time between transitions of said square wave signal from the scanner which signals are stored under control of said control signals by said first means.

4. The processor set forth in claim 3 in which said second means includes:

clock signal generating means responsive to the said circuit means and said fixed frequency oscillator for continuously providing n clocking signals each synchronized with $n$ sequential transitions of the said control signals, and $n$ counter means each responsive to the fixed frequency oscillator and a different one of said $n$ clocking signals for accumulating a count between successive clocking signals which corresponds to the length of a character in the direction of information content, and

*n* register means each responsive to one of said *n* counter means and the aforesaid associated clocking signals for storing the count attained by the said connected counter under control of the aforesaid associated clocking signals.

5. The processor set forth in claim 4 in which said third means includes:

*n* processing channels each connected to one of said *n* register means and each responsive to the aforesaid associated clocking signals for receiving and storing the contents of the connected register means under control of the aforesaid associated clocking signals and for comparing the said stored contents with the contents of the connected register means under control of the aforesaid clocking signals to encode and register at least two predetermined relationships of the contents compared.

6. A processor for selecting potentially valid code signals supplied by a coded label scanner which serially scans non-oriented coded labels supported on containers or the like and provides a continuous multilevel signal having at least two levels corresponding to the coded information on the label, said coded label having a plurality of optically encoded characters each of which includes a plurality of abutting substantially rectangular bars of differing light reflectivity, said bars for each of said characters having substantially the same total width in the direction of information content and at least one additional character having at least as many bars as the aforesaid characters and in which the total width of a number of bars equal to the number of bars in each of the aforesaid characters is of substantially different total width in the direction of information content comprising:

first means connected to said scanner for modifying the form of the signal supplied by said scanner and storing an epoch of the modified signal corresponding to the potentially valid code to be selected from amongst the signals received from the scanner;

second means responsive to the modified signals from said scanner for forming electric signals, for each of the character phases, which correspond to the total width of the character in the direction of information content;

third means for comparing substantially simultaneously for each of the said character phases of the modified signal, the total width in the direction of information content of successive characters and encoding and storing one of at least two predetermined relationships based on the results of the comparison;

fourth means for substantially simultaneously examining the encoded stored relationships and providing output signals whenever the said encoded relationships have a predetermined format; and fifth means responsive to the output signals provided by said fourth means for gating the then stored epoch of the modified signal in the first means to a utilization device.

7. The processor set forth in claim 6 in which the number of phases $\phi$ equals the number of bars $\psi$ used to encode each of the characters and each of the phases $\phi 1$–$\phi 4$ for a four bar coded character coincide in time with the transition occurring when the leading edge of the bars $\psi 1$–$\psi 4$ are detected by the scanner in a repetitive sequence.

8. The processor set forth in claim 7 in which the signal supplied by the said scanner is substantially a square wave signal which the scanner generates when scanning the coded label with a substantially constant velocity to provide a square wave signal corresponding to the bar coded label and said first means includes:

circuit means for providing control signals coincident with the transitions of the square wave signal supplied by the scanner;

a fixed frequency oscillator for providing electric signals at a fixed predetermined frequency; and counter means responsive to the control signals from said circuit means and said electric signals from fixed frequency oscillator for providing a count signal corresponding to the elapsed time between transitions of said square wave signal from the scanner which signals are stored under control of said control signals by said first means.

9. The processor set forth in claim 8 in which said second means includes:

clock signal generating means responsive to the said circuit means and said fixed frequency oscillator for continuously providing four clocking signals each synchronized with four sequential transitions of the control signals, and four counter means each responsive to the fixed frequency oscillator and a different one of said four clocking signals for accumulating a count between successive clocking signals which corresponds to the length of a character in the direction of information content, and four register means each responsive to one of said four counter means and the aforesaid associated clocking signals for storing the count attained by the said connected counter under control of the aforesaid associated clocking signals.

10. The processor set forth in claim 9 in which said third means includes:

four processing channels each connected to one of said four register means and each responsive to the aforesaid associated clocking signals for receiving and storing the contents of the connected register means under control of the aforesaid associated clocking signals and for comparing the said stored contents with the contents of the connected register means under control of the aforesaid clocking signals to encode and register at least two predetermined relationships of the contents compared.

* * * * *